Figure 1:
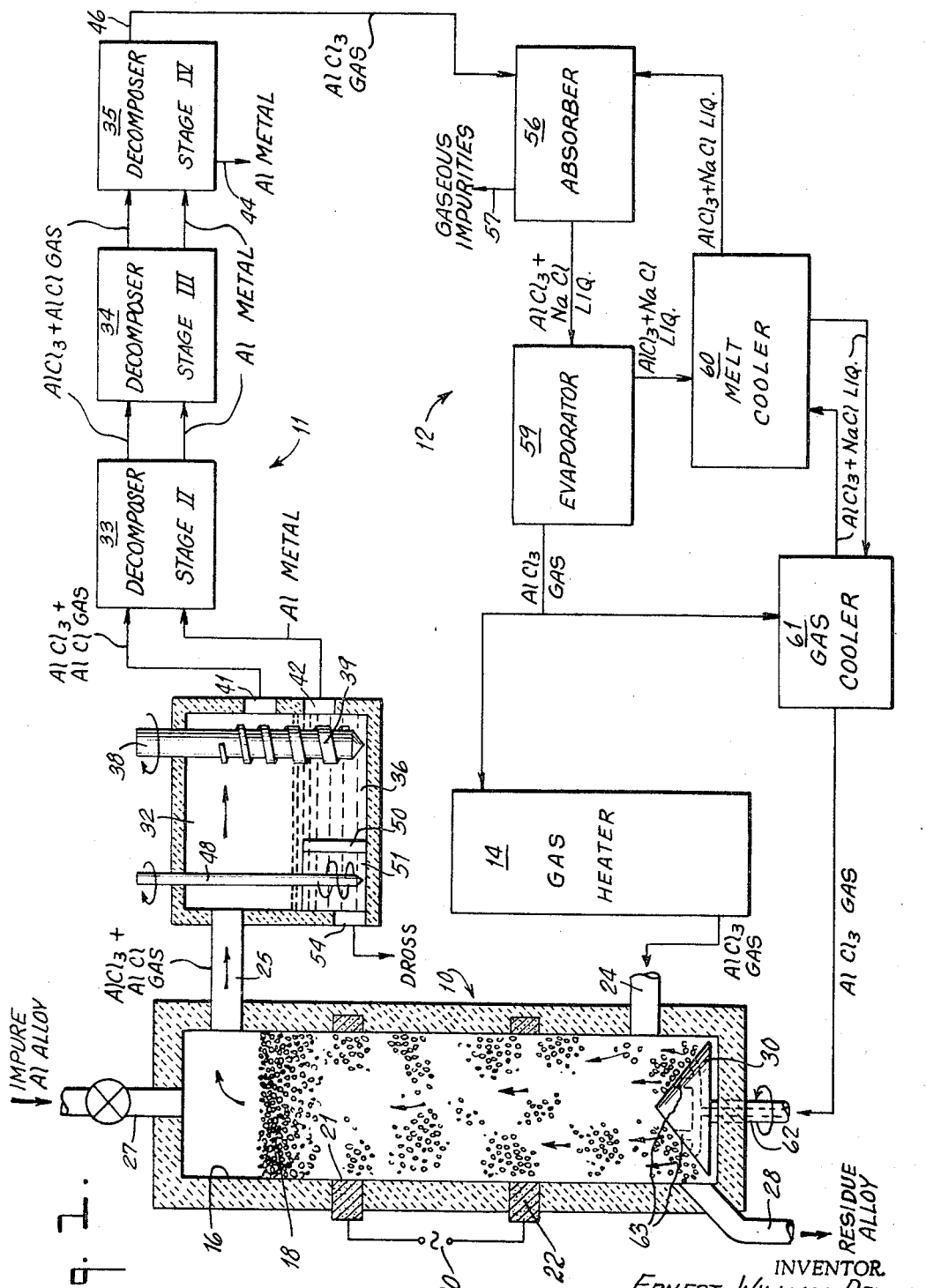

April 1, 1969

E. W. DEWING 3,436,211

PROCEDURES FOR REMOVING IMPURITIES FROM
ALUMINUM TRICHLORIDE GAS

Filed Oct. 28, 1966

Sheet _1_ of 3

INVENTOR.
ERNEST WILLIAM DEWING
BY
Robert S. Dunham
ATTORNEY

United States Patent Office 3,436,211
Patented Apr. 1, 1969

3,436,211
PROCEDURES FOR REMOVING IMPURITIES
FROM ALUMINUM TRICHLORIDE GAS
Ernest William Dewing, Arvida, Quebec, Canada, assignor to Aluminium Laboratories Limited, Montreal, Quebec, Canada, a corporation of Canada
Filed Oct. 28, 1966, Ser. No. 590,282
Int. Cl. C22b 5/18, 21/02; B01d 53/00
U.S. Cl. 75—68      13 Claims This invention relates to procedures for separating impurities from aluminum halide gas, and more particularly to procedures for removing volatilized calcium and magnesium chlorides from a flow of gas comprising aluminum trichloride. In an important specific aspect, the invention is directed to methods for removing calcium chloride and/or magnesium chloride from an aluminum subhalide distillation system.

The production of purified aluminum metal from impure aluminum-containing metallic materials, such as crude alloy obtained by direct reduction of bauxite, may be effected by subhalide distillation procedure wherein aluminum in the impure material is reacted with aluminum trichloride ($AlCl_3$) gas, as disclosed, for example, in United States Patent No. 2,937,082. In an illustrative system for such operation, a mass of granules or particles of the crude alloy is exposed to a continuous flow of trichloride gas in a suitable converter or furnace at a temperature ordinarily above 1,000° C., for reaction of aluminum in the crude alloy with the trichloride to form aluminum monochloride ($AlCl$) gas. The monochloride, together with unreacted trichloride, is led from the converter to a decomposing region where it is cooled sufficiently to decompose the monochloride into reconstituted aluminum trichloride gas and the desired purified product aluminum metal. A flow of trichloride gas is discharged from the decomposer, usually at a temperature somewhat above the melting point of aluminum (e.g. at a temperature of about 700° C.); for the sake of convenience and economy of operation, this flow is recycled to the converter for re-use therein.

As distillation proceeds in a system of the type described, various gaseous impurities are produced in the system and introduced to the circulating gas flow. In addition to so-called permanent gases such as hydrogen, these impurities commonly include volatilized calcium and magnesium chlorides formed in the converter by reaction of aluminum trichloride with calcium and magnesium values present in the crude alloy. Although the boiling points of the two chlorides are higher than presently contemplated ordinary temperatures of converter operation, and their normal vapor pressures are negligible at and below the decomposer exit gas temperature, nevertheless it is found that substantial amounts of both calcium and magnesium chlorides may be present in gaseous state not only in the gas flow from the converter but also in the flow of trichloride gas discharged from the decomposer; and it is further found that these contaminant chlorides tend to build up in the distillation system as the trichloride flow is repeatedly recycled. Such accumulation of calcium and/or magnesium chlorides in the system may raise the content of the volatilized chlorides in the circulating gas flow to levels sufficient to reduce operating efficiency, and may also result in progressive condensation of one or both chlorides at system localities beyond the converter, interfering with the desired operation of the system.

An object of the present invention is to provide new and improved procedures for removing volatilized calcium and/or magnesium chlorides from a flow of gas comprising aluminum trichloride in a convenient, operationally simple and effective manner. Another object is to provide such procedures for removing one or both chlorides in substantially continuous manner from a circulating flow of gas comprising aluminum trichloride in an aluminum subhalide distillation system, so as to maintain the content of calcium and/or magnesium chlorides in the flow at levels at which these chlorides have no significant adverse effect on system efficiency or operation.

A further object is to provide such procedures wherein calcium and/or magnesium chlorides are removed by condensation resulting from a temperature change of the gas flow effected incident to, and at a locality of, other gas flow treatment in a subhalide distillation system, thereby obviating any need for provision of supplemental gas flow circuitry or system elements, or for special supply or withdrawal of thermal energy, to effectuate such removal. A still further object is to provide procedures of the foregoing type wherein the condensation of one or both chlorides at the condensing locality is promoted by supplemental reduction of their effective vapor pressure at such locality.

Yet another object is to provide procedures for subhalide distillation of aluminum utilizing a circulating flow of gas comprising aluminum trichloride, wherein volatilized calcium and/or magnesium chlorides carried in the gas flow are condensed in the distillation system at a selected locality from which they are conveniently removable, and wherein temperature conditions throughout the system are maintained at values chosen to prevent progressive condensation of chlorides at system localities other than the selected locality.

The present invention embraces the discovery that the effective vapor pressures of both calcium chloride and magnesium chloride in an aluminum trichloride atmosphere vary with temperature in such manner that they have minimum values at about 1100° C. and about 900° C., respectively. Stated with reference to calcium chloride, this means that as the temperature of a flow of gas comprising aluminum trichloride approaches the vicinity of 1100° C. in either direction, the volatility of calcium chloride in the flow decreases. Thus, heating or cooling of the flow to the temperature of the vapor pressure minimum from a lower or higher initial temperature will cause condensation of calcium chloride from the flow, to the extent that the initial content of volatilized calcium chloride in the flow (i.e. the initial molar ratio of calcium to aluminum therein) exceeds a limiting value corresponding to the volatility of calcium chloride in aluminum trichloride at the effective vapor pressure minimum, thereby reducing the level of calcium chloride in the flow to this limiting value; but subsequent heating of the flow above, or cooling of the flow for as much as several hundred degrees below, the vicinity of 1100° C. will not cause further condensation of calcium chloride, because its volatility in the flow increases as the flow temperature departs either upwardly or downwardly from the temperature of the vapor pressure minimum. The volatility of magnesium chloride in an aluminum trichloride flow exhibits similar variation, and with like effect on the content of the chloride in the flow, as the flow temperature approaches the vicinity of 900° C. in either direction.

In a broad sense, as applied to the treatment of a gas flow comprising aluminum trichloride gas which contains volatilized calcium or magnesium chloride and is at an initial temperature either above or below the temperature of the effective vapor pressure minimum for the volatilized chloride, the invention contemplates changing the temperature of the gas flow in the direction of the temperature of such vapor pressure minimum (by cooling or heating, as appropriate) for effecting condensation of calcium or magnesium chloride therefrom. More particularly, the method of the invention comprises the steps of conducting the gas flow (as it advances along a defined path) into extended surface contact with nongaseous material at a preselected locality in the path of the flow while maintaining the nongaseous material at a predetermined temperature which is closer to the temperature of the vapor pressure minimum than is the initial gas flow temperature, so as to cause the contained volatilized chloride to condense on the surface of the nongaseous material, and removing the chloride in condensed state from the preselected locality to a locality external to the flow path. The invention is equally applicable to the treatment of gas flows containing both chlorides in volatilized state, to effect condensation of both chlorides.

As will be understood, condensation of magnesium and/or calcium chloride from the gas flow occurs upon contact thereof with the nongaseous material surface because the volatility of the condensing chloride or chlorides in aluminum trichloride is lower at the surface temperature than at the initial flow temperature; this condensation proceeds until the content of such chloride in the flow is reduced substantially to a level determined by its volatility at the surface temperature. In the case of a trichloride flow which circulates continuously through a subhalide distillation system, any increment in calcium and/or magnesium chloride content above the latter level, added to the flow on a subsequent pass through the converter, is removed during the same cycle in the selected locality of chloride condensation. Thus the calcium or magnesium chloride content of such flow is maintained at a more or less constant and desirably low value, and there is essentially no accumulation of the contaminant chloride within the system in any progressive or continuing sense because the condensate is removed from the condensing locality.

The invention in a specific sense also contemplates effectuation of such contaminant chloride removal either in the decomposer of the system or in a region of the trichloride flow circuit at which the flow, after discharge from the decomposed but before return to the converter, is preheated (in accordance with preferred practice) substantially to the converter operating temperature. In this connection, it may be explained that the presently preferred ranges of converter and decomposer exit gas temperatures as selected for optimum system efficiency are respectively above and below the 900° C.–1100° C. range at which the aforementioned effective vapor pressure minima of calcium and magnesium chlorides occur; hence the temperatures of the vapor pressure minima are intermediate the inlet and exit gas temperatures of both the decomposer and the preheating region in such preferred operation. Accordingly, the condensation of the contaminant chloride or chlorides may readily be accomplished within either of these regions, incident to the cooling of the gas for monochloride decomposition or the subsequent preheating of the gas, by providing at a suitable locality therein nongaseous material in extended surface contact with the gas flow and maintained at the predetermined condensing temperature.

In other words, the step of supplying heat to or withdrawing heat from the gas for condensation of the magnesium and/or calcium chloride may be performed as a stage in the preheating of the gas flow or the cooling thereof in the decomposer, avoiding the necessity for provision of additional supply or withdrawal of thermal energy or supplemental system elements, yet without interfering in any way with the decomposing or preheating operations. Removal of the contaminant chloride condensate from the selected condensing locality in either region of the system may be effected with relative ease. The temperatures of the effective vapor pressure minima are higher than the melting points of calcium and magnesium chlorides; therefore the condensate of either or both chlorides is in molten (liquid) state, facilitating removal thereof, at the condensing temperatures herein contemplated.

As an important further specific feature of the invention, operating conditions in the subhalide distillation system may be so controlled that at all system localities other than the selected condensing locality, the temperatures encountered by the trichloride flow are more remote from the temperatures of the effective vapor pressure minima of the contaminant chlorides than is the predetermined temperature of the condensing region. In this way, progressive condensation of contaminant chlorides at such other system localities is prevented and such condensation is restricted to the selected locality, at which provision may be made for convenient removal of the condensate.

The constant concentration level of volatilized calcium and/or magnesium chlorides in the gas flow is determined by the effective vapor pressure thereof at the predetermined temperature of the condensing locality, and may be maintained sufficiently low to avoid interference with system efficiency or operation by selecting a value of condensing temperature appropriately close to the temperature of the effective vapor pressure minima of the chloride or chlorides being condensed. Nevertheless, in some cases it may be found desirable to reduce the effective vapor pressure of such chloride or chlorides at the condensing locality further than is possible by temperature selection alone, in order to achieve additional lowering of the constant concentration level. This supplemental reduction of effective vapor pressure may be achieved, in accordance with the invention, by providing at the condensing locality a molten metal chloride capable of absorbing the chloride to be condensed, so as to form a molten mixture of the condensing chloride and the second chloride.

Figure 2:
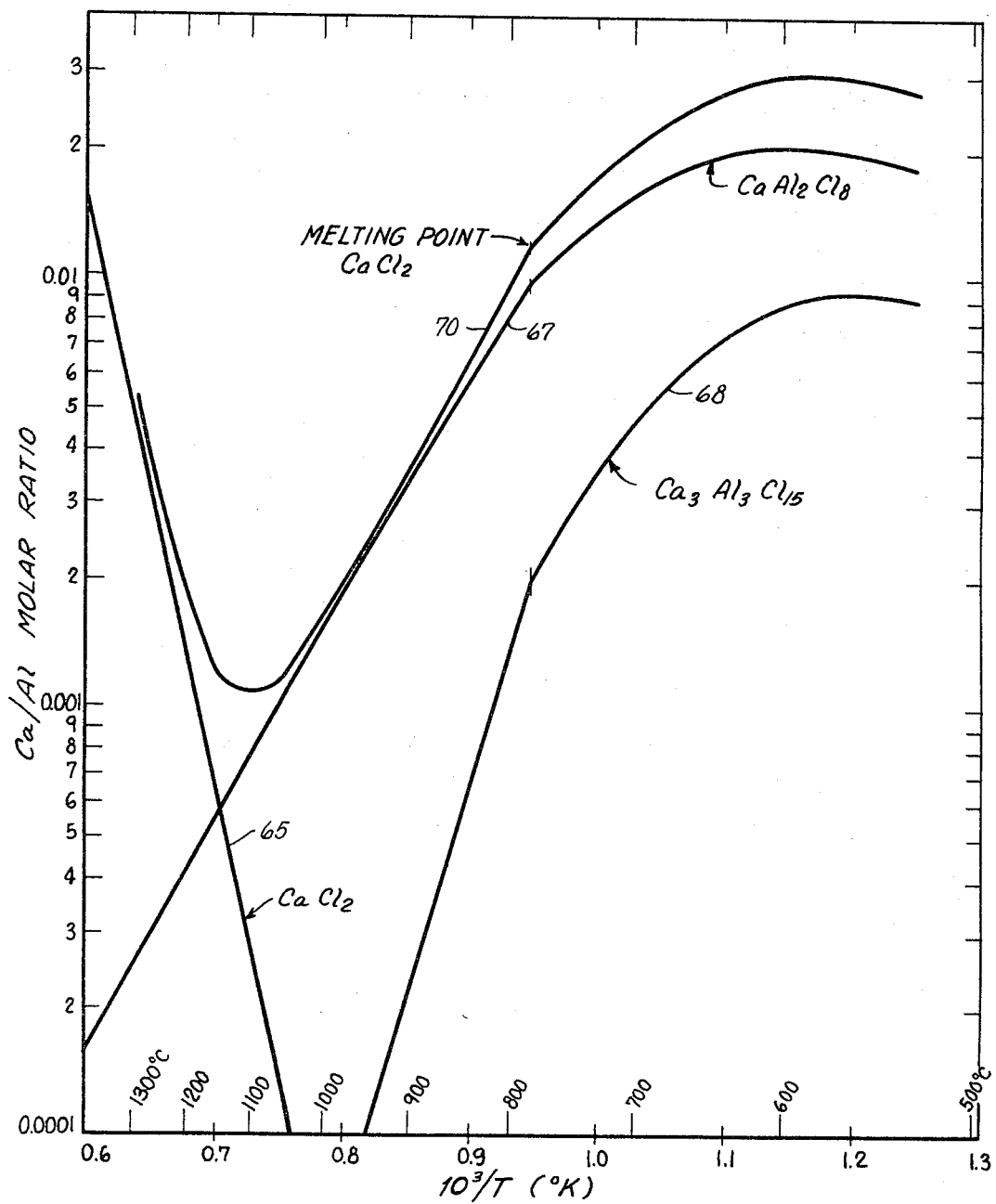
Figure 3:
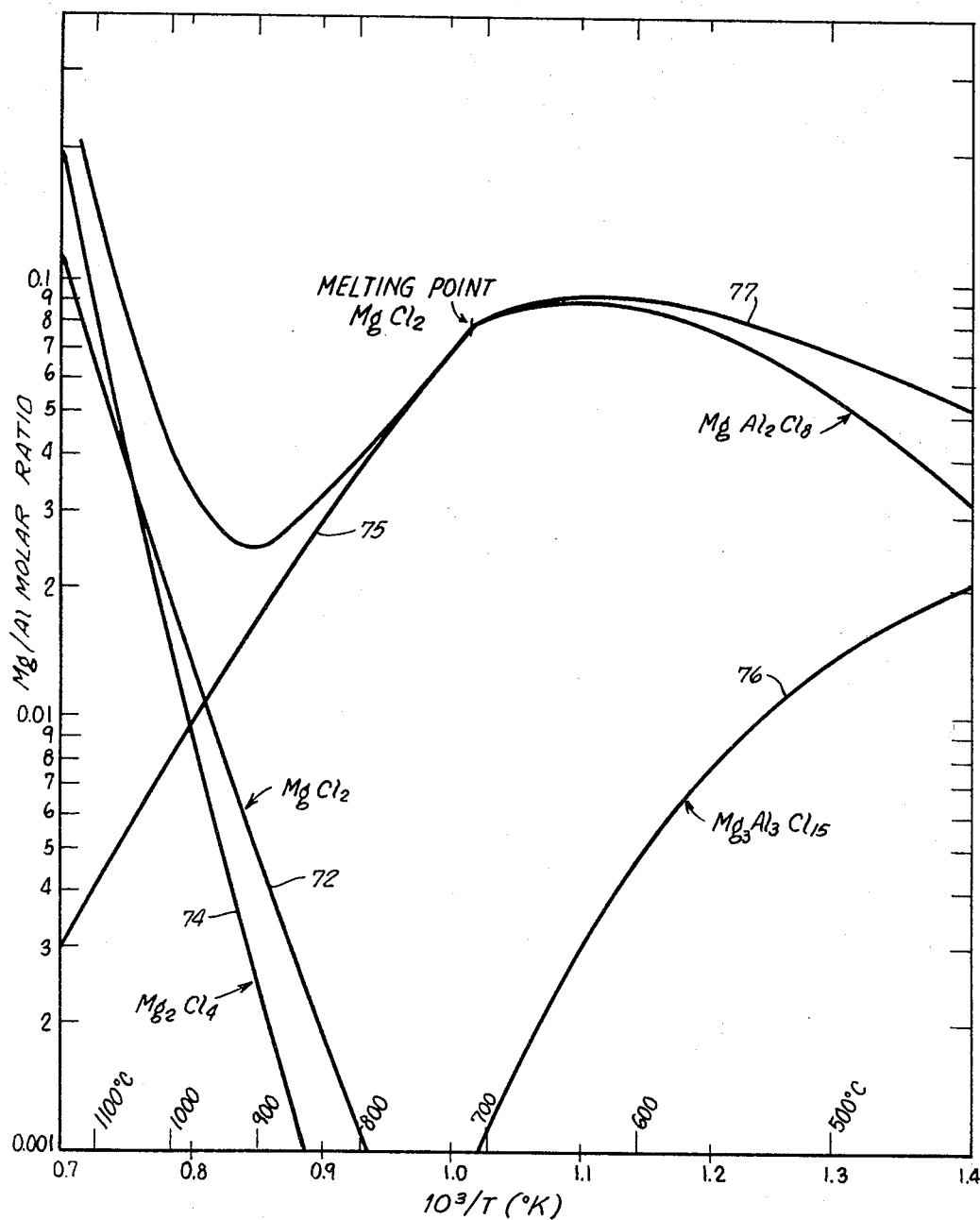

Further features and advantages of the invention will be apparent from the detailed description hereinbelow set forth, together with the accompanying drawings, wherein:

FIG. 1 is a schematic and largely diagrammatic view of an exemplary form of aluminum subhalide distillation system in which the method of the present invention may be practiced;

FIG. 2 is a graph of the effective vapor pressure of calcium chloride in aluminum trichloride gas, as a function of temperature over a presently contemplated range of operating temperatures of a system as shown in FIG. 1, wherein the vapor pressure is represented as molar ratio of calcium to aluminum in the gas; and FIG. 3 is a graph similar to FIG. 2 relating the effective vapor pressure of magnesium chloride in aluminum trichloride gas (expressed as molar ratio of magnesium to aluminum) to temperature, over the same temperature range.

For clarity of understanding of the present invention, reference may first be made to the general arrangement and operation of the system of FIG. 1 as illustrative of subhalide distillation systems utilizing aluminum trichloride gas and adapted to produce purified aluminum metal from crude alloy obtained by direct reduction of bauxite. This system includes a converter 10, a decomposer 11, a gas purification system 12 for removal of certain impurities carried in the trichloride flow discharged from the decomposer, and a gas heater 14 for preheating the trichloride flow discharged from the purification system 12 before reintroduction of such flow to the converter.

The converter structure comprises a vertically elongated and refractory-lined confined chamber 16 substantially filled with a mass 18 of crude alloy granules or particles. The alloy mass is heated electrically by passage of alternating current therethrough, from a suitable source 20, between vertically spaced annular electrodes 21 and 22 mounted in the wall of the converter. A continuous flow of heated aluminum trichloride gas advances upwardly through the alloy mass in the converter from a gas inlet 24 to a gas outlet 25, reacting with aluminum in the alloy to form aluminum monochloride gas; the monochloride, together with unreatced trichloride, passes through outlet 25 to the decomposer 11. Successive quantities of unreacted crude alloy are supplied to the top of the converter chamber through the alloy inlet 27, while spent residue alloy is expelled from the lower end of the converter through residue outlet 28 by rotation of a suitably driven cone 30 on which the mass 18 rests, so that the supplied alloy granules descend through the chamber 16 to the outlet 28 as they are progressively depleted of aluminum by reaction with the trichloride.

The decomposer 11 is of the general type disclosed in the copending application of Norman W. F. Phillips, Bryan Rapson and Frederick William Southam, Ser. No. 407,760, filed Oct. 30, 1964 for Gas-Liquid Contact Apparatus, now U.S. Patent No. 3,311,363 issued Mar. 28, 1967, and comprises four refractory-lined chambers respectively designated 32, 33, 34 and 35, wherein the gas flowing from the converter gas outlet 25 is progressively cooled to effect decomposition of the monochloride into purified molten aluminum metal and reconstituted aluminum trichloride gas. The first of these chambers, designated 32, is arranged to contain a body 36 of molten aluminum metal and includes one or more screw-lift impellers 38 each comprising an axially vertically cylindrical shaft 38 bearing on its periphery an upwardly opening helical trough 39. As the impeller shaft is rotated (by suitable means, not shown), molten aluminum from the body 36 ascends in the helical trough and is thrown outwardly therefrom by centrifugal force through the path of the gas advancing across the chamber from the converter gas outlet 25. Means (not shown) are provided for cooling the body of molten metal 36 to maintain it at a predetermined temperature lower than the initial gas temperature. Thus the spraying or splashing action of the impeller 38 effects extended surface contact of the gas flow with the molten metal at such predetermined temperature for cooling of the gas.

Chambers 33, 34 and 35 are similar in arrangement to the chamber 32, each containing a body of molten aluminum and being provided with one or more impellers similar to that shown at 38. These chambers, represented only diagrammatically in FIG. 1, are so disposed (preferably in horizontal alignment with each other and with chamber 32) that the gas flow leaving chamber 32 through outlet opening 41 successively traverses the remaining chambers, and are further so arranged that the molten aluminum can flow between the chambers (as indicated by outlet opening 42 in chamber 32) although the aluminum body in each chamber is individually cooled by means (not shown) to a predetermined temperature lower than that of the metal in the preceding chamber or chambers. In this way, the gas advancing through the four chambers is progressively cooled by splash contact with molten metal at progressively lower temperatures, until in the final chamber it reaches the desired decomposer gas outlet temperature. During such traverse of the decomposer, the monochloride is essentially entirely decomposed to aluminum metal and trichloride gas. The product metal, conveniently in molten state, is discharged from the final decomposer chamber 35 as indicated at 44; a continuous flow of trichloride gas (including both unreacted trichloride advanced to the decomposer from the converter, and reconstituted trichloride produced upon decomposition of the monochloride) is also discharged from chamber 35, as indicated at 46.

As the decomposing operation proceeds, a dross constituted of various impurities forms on the surface of the molten aluminum body in the decomposer. This dross may be continuously or periodically removed by a dross-removal arrangement of the type disclosed in the copending application of Henry James Howie, Thomas Barnett Rance, Bryan Rapson and Frederick William Southam, Ser. No. 368,456 filed May 15, 1964 for Process and Apparatus for Separation of Material from Liquid, now U.S. Patent No. 3,400,923 issued Sept. 10, 1968. Such arrangement, shown schematically as included in chamber 32, comprises an axially vertical screw 48 which extends downwardly into the molten aluminum body 36 and is surrounded at its lower extent by a shroud 50 defining a well 51 with an upper rim slightly below the surface of the aluminum body 36. Rotation of the screw 48 (by suitable means, not shown) causes the dross on the surface of the body 36, together with some molten metal, to be drawn downwardly into the well 51 and expelled through an outlet opening 54 into an external dross pool (also not shown) where the dross is separated from the metal as by surface skimming, the metal being recirculated from the pool to the body 36.

The flow of aluminum trichloride gas discharged at 46 from the fourth stage 35 of the decomposer is returned to the converter gas inlet 24, as hereinafter further explained, for re-use in the converting operation. As the gas flow is repeatedly recycled through the distillation system, so-called permanent gas (e.g. hydrogen) produced in the system tends to accumulate in the flow, impairing the efficacy of the distillation process. This permanent gas is separated and removed from the trichloride flow by means of the gas purifying system 12, which may be of the general type disclosed in U.S. Patent No. 3,235,376, and through which the entire gas flow is directed after leaving the decomposer and prior to return to the converter.

In the illustrated purification system 12, the trichloride flow from the decomposer is conducted into an absorber vessel 56, where it is brought into intimate surface contact with a flow of molten salt conveniently comprising a mixture of sodium chloride and aluminum trichloride in such relative proportions as to be capable of absorbing essentially all the aluminum trichloride of the gas flow at the temperature of the absorber. The trichloride condenses in the molten salt mixture in the absorber, while the permanent gas remains uncondensed and is led off as indicated at 57.

From the absorber, the molten salt (now enriched in aluminum trichloride) is led to an evaporator vessel 59 where it is heated, as by passage of alternating current therethrough between spaced electrodes immersed in the salt flow, to re-evaporate a proportion of the trichloride content substantially equal to the increment in such content added by condensation in the absorber 56. This re-evaporated trichloride gas, now free of permanent gas, is conducted from the evaporator for return to the converter 10, while the trichloride-lean molten salt is led from the evaporator to a melt cooler 60 and there cooled for return to the absorber 56 to absorb further quantities of trichloride gas. As indicated, the molten salt flows continuously from the absorber to the evaporator and thence to the cooler and back to the absorber, being successively heated to evaporate trichloride, and cooled to enable absorption of trichloride, during each cycle through this circuit.

The major portion of the trichloride gas flow from the evaporator 59 is conducted to the gas heater 14 for heating substantially to the converter operating temperature. By way of example, the heater 14 may comprise a packed tower filled with bodies of carbonaceous material maintained at the converter operating temperature by electrical resistance heating and through which the trichloride flow passes downwardly. From the heater, the gas flow is led directly to the converter gas inlet 24 for reaction with further quantities of crude alloy in the converter.

In the system shown, a minor proportion of the trichloride gas from the evaporator 59 is diverted from the major flow upstream of the heater 14 and led to a gas cooler 61 where it is reduced in temperature by contact with a relatively cool body of molten salt, e.g., a molten mixture of sodium chloride and aluminum trichloride maintained by suitable cooling means at the desired low temperature. After cooling, this minor flow of trichloride gas is advanced to a gas passage 62 within the rotary cone 30 at the base of the converter chamber 16, and discharged, through a plurality of openings 63 in the cone surface, into the lower end of the mass 18 of alloy granules in the converter. In this way, the spent residue at such lower end of the mass 18 is cooled prior to discharge through the residue outlet 28. The cool trichloride gas flowing upwardly through the mass 18 is heated by contact with the mass and rejoins the major flow of trichloride in the converter.

In a typical example of operation of the above-described system, fresh crude alloy is charged to the converter 10 at a rate of 4,000 lbs. per hour, a corresponding quantity of residue being discharged through the outlet 28. Aluminum trichloride gas is circulated continuously through the system at a rate of 20,000 lbs. per hour for reaction with this alloy. The converter operating temperature is 1,250° C., and the trichloride-monochloride gas mixture leaving the converter through outlet 25 is cooled progressively in the four stages of the decomposer 15 to a final temperature of 700° C.

Twenty thousand lbs. per hour of aluminum trichloride gas leaving the fourth stage of the decomposer at 700° C. and carrying permanent gas are absorbed in a molten mixture of aluminum trichloride and sodium chloride in the absorber 56 at a melt temperature e.g. below 300° C. In the evaporator, the melt is heated to 430° C., and 20,000 lbs. of aluminum trichloride gas are discharged from the evaporator at the latter temperature while the lean salt melt is advanced in the evaporator to the cooler 60 where it is cooled to the absorber temperature.

Of the trichloride gas flow discharged from the evaporator, 18,450 lbs. per hour (92.25% of the flow) are led to the gas heater for heating from 430° C. to 1,250° C., and then returned, at the latter temperature, to the converter. One thousand five hundred fifty lbs. per hour (7.75% of the flow) are led to the gas cooler 61 for cooling from 430° C. to 210° C., and introduced to the base of the converter at the latter temperature through the passage 62 in cone 30.

As stated, the crude alloy charged to the converter and produced by direct reduction of bauxite contains minor quantities of magnesium and calcium. Typical exemplary values of such content are 0.04% calcium and 0.025% magnesium by weight in the alloy. The calcium and magnesium react with aluminum trichloride in the converter to form aluminum monochloride and calcium chloride, and aluminum moonchloride and magnesium chloride, respectively. With alloy having the aforementioned values of calcium and magnesium content, in the example of system operation just described, 4.4 lbs. of calcium chloride and 3.9 lbs. of magnesium chloride per hour will be formed by such reaction in the converter. Assuming complete volatilization of both these chlorides, and an aluminum trichloride flow rate of 20,000 lbs. per hour, the molar ratio of calcium to aluminum (i.e. the aluminum of the trichloride, not including aluminum extracted from the alloy and distilled as monochloride) in the gas and the molar ratio of magnesium to aluminum in the gas are each increased by 0.00037 on each pass through the converter. It will be understood, of course, that all the foregoing values are set forth only for purposes of illustration, and may vary widely in practice.

The behavior of the produced calcium and magnesium chlorides and their effect in the system may be further understood by consideration of the characteristics of their effective vapor pressures in aluminum trichloride as discovered by applicant and represented graphically in FIGS. 2 and 3.

Referring now to FIG. 2, this graph shows the effective vapor pressure of calcium chloride in aluminum trichloride gas, expressed in terms of molar ratio of calcium to aluminum in the gas as a function of temperature at a total gas pressure of 1 atm. In the graph, the normal or ordinary vapor pressure of calcium chloride is represented by line 65. This vapor pressure increases with temperature, and is insignificant at temperatures as low as 700° C. (the decomposer exit gas temperature in the example of operation described above); accordingly, the observed substantial volatility of calcium chloride in aluminum trichloride at temperatures of 700° C. and below cannot be attributed to the normal vapor pressure.

However, as applicant has found, over a temperature range of several hundred degrees extending well below the decomposer exit gas temperature, calcium chloride combines with aluminum trichloride in gaseous complexes and is appreciably volatilized, in a trichloride gas flow, in the form of such complexes. It is presently believed that there are at least two species of these complexes. The effective partial vapor pressures of calcium chloride attributable to the two species, which have provisionally been assigned the formulas $CaAl_2Cl_8$ and $Ca_3Al_3Cl_{15}$, are represented in FIG. 2 by lines 67 and 68, respectively; as will be apparent from the graph, the equilibrium constants for the formation of the complexes are related to temperature in such manner that both these effective partial vapor pressures rise with temperature to maximum values in the vicinity of 600° C. and thereafter decrease with increasing temperature.

The total effective vapor pressure of calcium chloride in aluminum trichloride (line 70 in FIG. 2) is thus equal to the sum of the effective partial vapor pressures attributable to the complex species and the ordinary vapor pressure of calcium chloride. At the contemplated temperatures of absorber operation in the system of FIG. 1, e.g. 300° C. and below, this total effective vapor pressure is negligibly small, but rises with temperature (following the curves of the partial effective vapor pressures attributable to the complexes) to a maximum at about 600° C. Above the latter value, as stated, the vapor pressures of the complexes decrease with rise in temperature while the normal vapor pressure of calcium chloride increases as the temperature rises; accordingly, the total effective vapor pressure of calcium chloride in aluminum trichloride decreases with increasing temperature until it reaches a minimum value of about 1 mm. of mercury in the vicinity of 1,100° C. (which is substantially above the melting point of calcium chloride), and thereafter rises again with further increases in temperature beyond the temperature of the minimum.

By way of further explanation of FIG. 2, it will be understood that as a flow of aluminum trichloride gas containing volatilized calcium chloride is cooled through a range of temperatures below that corresponding to the effective vapor pressure maximum at about 600° C., the volatility of the calcium chloride in the trichloride flow decreases. Such cooling, therefore, will effect essentially complete condensation of the calcium chloride if continued to a sufficiently low temperature. On the other hand, no condensation of calcium chloride can occur as the gas is cooled through the range of temperatures between that of the effective vapor pressure minimum at about 1,100° C. and that of the maximum at about 600° C., although heating of the gas through the latter range can effect such condensation to the extent that the level of calcium chloride content in the gas exceeds that corresponding to the vapor pressure minimum, because within this range the volatility of calcium chloride in aluminum trichloride increases with decreasing temperature. Again, if the trichloride gas temperature is higher than that of the aforementioned vapor pressure minimum, calcium chloride condensation may occur upon cooling of the gas toward the temperature of such minimum but cannot occur upon further heating of the gas, because the volatility of calcium chloride in the trichloride atmosphere increases with increasing temperature above the vapor pressure minimum.

As will be apparent from FIG. 3, the temperature dependence of the total effective vapor pressure of magnesium chloride in aluminum trichloride gas corresponds generally to that described above for calcium chloride. That is to say, the normal vapor pressure of magnesium chloride (line 72 in FIG. 3) increases with temperature as does the vapor pressure of magnesium chloride dimer (line 74), it being understood that magnesium chloride in volatilized state dimerizes to a significant extent. Magnesium chloride also form complexes (provisionally assigned the formulas $MgAl_2Cl_8$ and $Mg_3Al_3Cl_{15}$) with aluminum trichloride, and the vapor pressures of these complexes (respectively represented by lines 75 and 76) decrease with increasing temperature, at least at temperatures above about 700° C., again owing to the nature of the temperature dependence of the equilibrium constant for formation of these complexes. The total effective vapor pressure of magnesium chloride in aluminum trichloride (line 77) is the sum of the vapor pressures of the complex species and the normal or ordinary vapor pressures of magnesium chloride and its dimer; this total effective vapor pressure rises with temperature to a maximum value between 600° C. and 700° C., then falls with further temperature increase to a minimum of about 20 mm. of mercury at about 900° C. (which is substantially above the melting point of magnesium chloride), and thereafter rises again with increase of temperature above the temperature of the minimum.

Referring again to the system of FIG. 1, it will be appreciated from the foregoing considerations that the trichloride gas flow leaving the fourth stage 35 of the decomposer at 700° C. can carry significant quantities of both calcium and magnesium chlorides in volatilized state, i.e. as gaseous complexes formed with aluminum trichloride. In the absorber 56, essentially all calcium and/or magnesium chloride volatilized in the gas flow will condense into the molten aluminum trichloride-sodium chloride mixture (as constituents of the molten mixture) owing to the low temperature of the latter. In the evaporator 59, calcium and/or magnesium chloride will re-evaporate from the molten mixture and be carried therefrom wtih the trichloride gas flow; however, some of the previously absorbed calcium and/or magnesium chloride may remain in the melt which is transferred from the evaporator to the melt cooler.

Stated generally, the proportion of contaminant (i.e. calcium and/or magnesium) chlorides that will be volatilized from the melt in the evaporator is determined by the effective vapor pressure of such chloride or chlorides above the melt in the evaporator, and this effective vapor pressure is in turn dependent both on the temperature to which the melt is heated and on the content of magnesium and/or calcium chlorides in the melt. If the gas flow entering the absorber 56 at 700° C. contains a greater proportion of calcium and/or magnesium chloride than can be evaporated from the melt in the evaporator (as determined by the effective vapor pressure of such chloride or chlorides in the evaporator), the content of condensed contaminant chloride in the melt will increase progressively as the melt is repeatedly recycled through the absorber 56, evaporator 59 and melt cooler 60. Although a sodium chloride-aluminum trichloride melt can contain calcium and/or magnesium chloride in dissolved or molten state, if such content exceeds limiting saturation values of concentration determined by the minimum temperature to which the melt is cooled, solid deposition of the chloride or chlorides from the melt will occur. Thus, unless special provision is made for separating the deposited calcium and/or magnesium chlorides, progressive accumulation thereof in the melt will eventually result in solid deposition that may partially or completely clog the melt circuit.

To avoid this difficulty, it is necessary that the magnesium and/or calcium chloride content of the gas flow delivered to the absorber be maintained within a limit which is sufficiently low so that essentially all such chloride or chlorides condensed in the melt in the absorber are revolatilized in the evaporator, i.e. after initial attainment of a constant concentration level of these chlorides in the melt which is satisfactorily lower than the saturation point at the lowest temperature reached by the melt during its cycle through the purification system 12. By way of example, in the case of an aluminum trichloride-sodium chloride melt which is heated in the evaporator to a maximum temperature of 430° C., it is found that calcium chloride levels up to a calcium/aluminum molar ratio of about 0.0025 in the gas entering the absorber from the decomposer are sufficiently low so that no difficulty is encountered in the operation of the purification system 12. Such molar ratio in the gas will give a molar ratio of sodium to calcium in the melt of approximately 4.5:1, which is adequately low to avoid solid deposition of calcium chloride in the melt circuit.

That is to say, at an evaporator temperature of 430° C., the effective vapor pressure of calcium chloride in aluminum trichloride, above a sodium chloride-aluminum trichloride melt containing calcium chloride in an Na/Ca molar ratio of 4.5:1, corresponds to an Ca/Al molar ratio of 0.0025 in the gas. Accordingly, if the calcium chloride content of the incoming gas to the absorber is maintained at the latter level, the Na/Ca molar ratio in the circulating salt melt will initially build up to a level of 4.5:1 but thereafter all the calcium chloride condensed in the melt in the absorber will re-evaporate from the melt in the evaporator.

Since the minor flow of gas diverted to the gas cooler 61 is there reduced in temperature to 210° C. in the above described example of system operation, condensation of calcium chloride and magnesium chloride (from such minor flow) also occurs in the melt in the gas cooler. The gas delivered to the converter through passage 62 in cone 30 is essentially free of these contaminant chlorides, but they tend to build up in the melt in cooler 61 and eventually to condense in solid state therein, interfering with the cooler operation. However, the latter result can be avoided by circulating the melt from the cooler 61 to the gas purification system 12 and commingling it with the molten salt flow therein, as indicated diagrammatically in FIG. 1; in this way the constant concentration level of the magnesium and/or calcium chlorides in the cooler 61 will be the same as that in the melt of system 12, the increments of contaminant chloride absorbed in the melt in the cooler 61 being evaporated in the evaporator 59.

From FIGS. 2 and 3, it will further be understood that at a converter operating temperature of about 1,250° C., all the calcium and magnesium chloride formed in the converter (in operation with crude alloy having calcuim and magnesium contents of the exemplary values specified above) will be volatilized in the gas flow leaving the converter, and hence none will be removed with the residue alloy. In this regard, it may be explained that owing to the formation of monochloride, the volume of the gas flow increases substantially during passage through the converter, e.g. by a factor of about 1.7 in a typical instance of operation. Thus, referring to calcium chloride for purposes of illustration, even if the flow entering the converter through inlet 24 were saturated with calcium chloride and had a calcium-to-aluminum molar ratio of 0.0032, it would carry additional volatilized calcium chloride from the converter up to an amount corresponding to an increase of 0.0020 in calcium/aluminum molar ratio, owing to the aforementioned increase in gas volume; and still further calcium chloride, in an amount providing an increment of 0.0004 in calcium/aluminum molar ratio, could be carried from the converter by the minor flow of cooled aluminum trichloride which is stripped of calcium chloride in the gas cooler 61 before introduction to the converter. Still larger quantities of calcium chloride can be carried in volatilized state from the converter in the gas flow if the incoming gas is not saturated therewith. Similar considerations apply to the magnesium chloride produced in the converter.

In other words, the described conditions of converter operation are such as to produce continuing additions of calcium and magnesium chlorides to the aluminum trichloride gas flow passing through the converter, and these continuing increments are removed from the converter with the gas, being thereby carried into the portions of the system beyond the converter. As exemplified by the the aforementioned problem of solid condensation in the melt circuit of the gas purification system 12, the continuing production of calcium and magnesium chlorides may interfere with desired operation of the subhalide distillation system, especially in that progressive accumulation of these chlorides may occur at system localities downstream of the converter in the path of the gas flow. In its embodiments now to be described, the method of the present invention affords separation and removal of calcium and/or magnesium chlorides from the system in such manner as to maintain the content of these chlorides in the circulating trichloride flow essentially constant and at a level sufficiently low to prevent progressive condensation thereof anywhere in the system.

As incorporated in the described subhalide distillation procedure, the method of the invention is performed by conducting the gas flow containing volatilized calcium or magnesium chloride into extended surface contact with nongaseous material either in the decomposer 11 or in the gas heater 14 while maintaining the nongaseous material at a predetermined temperature which is closer to the temperature of the effective vapor pressure minimum of the contaminant chloride than is the temperature of the gas flow entering the selected locality, for changing the temperature of the gas flow in the direction of such vapor pressure minimum to effect condensation of contaminant chloride from the gas flow at the nongaseous material surface. Further in accordance with the invention, the temperatures of all other localities of the distillation system are maintained at values more remote than such predetermined temperature from the temperature of the effective vapor pressure minimum thereby to prevent condensation at these other localities. The contaminant chloride is extracted from the system by removing it, in condensed state, from the selected locality of condensation.

In one illustrative embodiment of the present method as practiced for removal of calcium chloride from the circulating gas flow in the system of FIG. 1, the molten body 36 of aluminum metal in the first stage or chamber 32 of the decomposer 11 is maintained, by cooling in suitable manner, at a predetermined temperature relatively close to the temperature of the effective vapor pressure minimum of calcium chloride in aluminum trichloride gas. The gas flow entering the chamber 32 from the converter, e.g. at a temperature of 1,250° C., is brought into extended surface contact with molten metal from the body 36 by the splashing or spraying action of the screw-lift impeller 38 already described, and is thereby cooled to a temperature in the vicinity of the pre-determined temperature of the molten metal. To the extent that the entering flow of gas carries volatilized calcium chloride in excess of a level determined by the molten metal temperature in chamber 32, calcium chloride condenses from the gas incident to contact with the molten aluminum and collects in molten state on the surface of the aluminum body 36 from which it may conveniently be removed together with other dross by the described action of the dross screw 48; that is to say, the screw 48 expels the molten condensed calcium chloride from chamber 32 into the aforementioned external dross pool, where the calcium chloride and other dross may be removed as by skimming.

The content of volatilized calcium chloride in the gas flow leaving chamber 32 through outlet 41 is thus limited to the aforementioned level determined by the molten metal temperature in the chamber. This gas advances through the second, third and fourth stages of the decomposer where it is cooled further by splash contact with molten aluminum metal maintained at successively lower temperatures, to complete the decomposition of monochloride in such gas by stepwise reduction of the gas temperature. However, the molten metal temperatures in each of these subsequent decomposer stages are more remote from the temperature of the calcium chloride effective vapor pressure minimum than is the temperature of the metal in chamber 32; hence the volatility of calcium chloride in the gas flow in each of these chambers is higher than in chamber 32, and the calcium chloride carried with the gas from chamber 32 does not condense in the subsequent decomposer stages but instead remains in gaseous state.

The trichloride flow delivered from the fourth stage 35 of the decomposer to the absorber 56 accordingly has a content of volatilized calcium chloride determined by the volatility of calcium chloride at the temperature in the decomposer first stage 32. This calcium chloride, together with the trichloride, condenses essentially completely in the molten salt mixture in the absorber. Calcium chloride re-evaporates with aluminum trichloride from the mixture in the evaporator 59, and, as hereinafter further explained, in steady state operation essentially all the calcium chloride condensed in the absorber is revolatilized in the gas flow leaving the absorber.

The major flow of aluminum trichloride gas which advances from the evaporator 59 to the gas heater 14 thus contains calcium chloride at a level determined by the conditions in chamber 32. In the gas heater, this major flow of trichloride is heated by contact with the carbonaceous bodies therein. These bodies are maintained at a temperature which is ordinarily higher than the predetermined temperature of the molten aluminum 36 in chamber 32, and which is in any event more remote than such predetermined temperature from the temperature of the effective vapor pressure minimum of the calcium chloride; for example, if the converter is operated at a temperature of 1,250° C., the carbonaceous bodies in heater 14 may likewise be maintained, by electrical resistance heating as mentioned above, at 1,250° C. Since the volatility of calcium chloride in aluminum trichloride at the temperature of these carbonaceous bodies is higher than at the predetermined temperature of the molten body 36 in chamber 32, no significant condensation of calcium chloride from the gas flow occurs in the heater, even though the temperature of the gas flow is shifted from a value below that of the calcium chloride effective vapor pressure minimum to a value above that of the minimum.

The minor flow of trichloride gas which is diverted to cooler 61 also contains volatilized calcium chloride at a level determined by the conditions in chamber 32. This calcium chloride condenses in the melt in cooler 61, and the gas passing from cooler 61 to the converter is essentially free of calcium chloride; but the melt from cooler 61 is circulated to the melt circuit of the gas purifying system 12, and the calcium chloride condensed in cooler 61 is thereby introduced to the flow of molten salt in the latter circuit for re-evaporation in evaporator 59 so there is no progressive condensation or loss of calcium chloride in cooler 61.

The volatility of calcium chloride in aluminum trichloride at the operating temperature of the converter 10 is higher than that in chamber 32. This circumstance, as well as the above-described expansion in gas volume that takes place in the converter, and the supply to the converter of the cooled minor flow (free of calcium chloride) through the cone openings 63, enables additional calcium chloride to be volatilized in the gas flow in the converter upon reaction of trichloride with calcium values present in the alloy charge. However, to the extent that the increment in calcium chloride content of the gas added on each pass through the converter raises such content above the level determined by the volatility of calcium chloride in chamber 32, the added calcium chloride condenses in chamber 32 so that the gas flow leaving chamber 32 through outlet 41 is once more reduced in calcium chloride content to the previously established level.

In this way, once the calcium chloride content of the gas has built up (after initiation of system operation) to the level permitted by its volatility at the temperature of the metal encountered in chamber 32, the proportion of volatilized calcium chloride in the gas remains essentially constant at all system localities between the outlet 41 of chamber 32 and the converter 10, the excess calcium chloride added on each pass of the gas through the converter 10 being removed by condensation as the gas subsequently advances through chamber 32. In the melt circuit of the purifying system 12, the concentration of calcium chloride in the sodium chloride-aluminum trichloride molten mixture initially builds up to a level determined by the constant concentration level of calcium chloride in the gas entering absorber 56 and the operating temperature of evaporator 59; thereafter, essentially all calcium chloride condensed in the absorber 56 is reevaporated in the evaporator 59, since the calcium chloride content of the incoming gas to the absorber remains at a constant level, and there is accordingly no progressive build-up of calcium chloride in the melt circuit. By selecting the predetermined temperature of the molten aluminum body 36 in chamber 32 at a value appropriately close to the temperature of the effective vapor pressure minimum of calcium chloride in aluminum trichloride, the constant concentration level of calcium chloride in the gas flow entering the absorber may be maintained sufficiently low so that the constant concentration level of calcium chloride in the circulating melt is well below the saturation point at which solid condensation could occur at the lowest temperature encountered by the molten mixture in the melt circuit. In a typical example of operation, the temperature of the body 36 may be selected within a range of e.g. about 1,000° C. to 1,100° C. (preferably about 1,050° C. to 1,100° C.), with the subsequent decomposer stages 33, 34 and 35 having molten aluminum temperatures of 900° C., 800° C. and 700° C. respectively, and with the converter 10 and gas heater 14 having operating temperatures of about 1,250° C.

Further, in the described operation, there is no condensation of calcium chloride at any system locality (other than the absorber 56 and cooler 61) outside of the chamber 32, because the temperature conditions at these other system localities—viz the second, third and fourth stages of the decomposer and the gas heater 14—are so chosen that the effective vapor pressures of calcium chloride and hence the volatility of calcium chloride therein are higher than in chamber 32. In other words, progressive condensation of calcium chloride occurs only in chamber 32, from which the condensate may be readily and conveniently removed, thus obviating any need for provision of means or arrangements for removing condensed calcium chloride at other system localities. The chloride condensation in chamber 32 effectively controls the level of calcium chloride content in the circulating gas flow to a constant value that does not interfere with system operation. At the same time, this condensation is incorporated in the decomposing operation itself and performed concomitantly with the first stage of such operation; i.e., the removal of heat from the gas flow in chamber 32 both effects calcium chloride condensation and constitutes the first stage in the stepwise cooling of the gas for monochloride decomposition.

By way of specific illustration of the method of the invention in the embodiment just described, reference may be made to the following table, wherein the constant concentration level of calcium chloride in the gas flow, and the amounts condensed or separated from the flow in the converter residue, the first stage of the decomposer and the gas heater on each pass through the system, are set forth for various decomposer and converter temperatures. The data given in the table have been computed on the assumptions that no calcium chloride is removed in the melt circuit of the purifying system 12 or the cooler 61 (i.e. that all calcium chloride condensed therein, above a given constant concentration level of the melt, is revolatilized in the evaporator, the melt from cooler 61 being circulated to the melt circuit of system 12); that the gas heater is at the same temperature as the converter; that the crude alloy in the converter has an aluminum activity of 0.75 (this value determining the gas volume increase in the converter resulting from monochloride formation); and that the increment of calcium chloride in the gas flow added on each pass through the converter corresponds to an increase of 0.00050 in calcium/aluminum molar ratio in the gas. All amounts of calcium chloride in the table are expressed in terms of calcium/aluminum molar ratio present in or removed from the gas, and all indicated decomposer temperatures are temperatures at which the molten aluminum metal is maintained in the first stage (chamber 32) of a multistage splashed-metal decomposer of the type hereinabove described.

DECOMPOSER 1,000° C.

| Converter Temp. (° C.) | 1,050 | 1,100 | 1,150 | 1,200 | 1,250 | 1,300 |
| --- | --- | --- | --- | --- | --- | --- |
| Ca in Converter Residue | 0.00023 | 0.00018 | 0.00000 | 0.00000 | 0.00000 | 0.00000 |
| Ca in Decomposer | 0.00000 | 0.00000 | 0.00000 | 0.00037 | 0.00050 | 0.00050 |
| Ca in Heater | 0.00027 | 0.00032 | 0.00050 | 0.00013 | 0.00000 | 0.00000 |
| Ca in Gas | 0.00149 | 0.00142 | 0.00175 | 0.00193 | 0.00193 | 0.00193 |

DECOMPOSER 1,050° C.

| Converter Temp. (° C.) | 1,050 | 1,100 | 1,150 | 1,200 | 1,250 | 1,300 |
| --- | --- | --- | --- | --- | --- | --- |
| Ca in Converter Residue | | 0.00018 | 0.00000 | 0.00000 | 0.00000 | 0.00000 |
| Ca in Decomposer | | 0.00000 | 0.00024 | 0.00050 | 0.00050 | 0.00050 |
| Ca in Heater | | 0.00032 | 0.00026 | 0.00000 | 0.00000 | 0.00000 |
| Ca in Gas | | 0.00142 | 0.00149 | 0.00149 | 0.00149 | 0.00149 |

DECOMPOSER 1,100° C.

| Converter Temp. (° C.) | 1,050 | 1,100 | 1,150 | 1,200 | 1,250 | 1,300 |
| --- | --- | --- | --- | --- | --- | --- |
| Ca in Converter Residue | | | | 0.00000 | 0.00000 | 0.00000 |
| Ca in Decomposer | | | | 0.00031 | 0.00050 | 0.00050 |
| Ca in Heater | | | | 0.00019 | 0.00000 | 0.00000 |
| Ca in Gas | | | | 0.00142 | 0.00142 | 0.00142 |

As will be apparent from the table, in all instances in which the temperature of the decomposer first stage is substantially closer than the converter and heater temperature to the temperature of the effective vapor pressure minimum of calcium chloride in aluminum trichloride, condensation of calcium chloride from the gas flow occurs only in the decomposer. However, when the temperature of the converter and heater is closer to the temperature of the effective vapor pressure minimum than is the decomposer temperature, condensation may occur in the converter residue and/or in the heater; thus, for example, when the decomposer temperature is 1,000° C., no condensation occurs in the decomposer at converter and heater temperatures of 1,050° C, to 1,150° C., whereas when the temperature of the converter and heater is at or above 1,250° C., condensation occurs only in the decomposer. It will further be apparent from the table that the constant concentration level of calcium chloride in the gas flow, i.e. that carried in the gas after passage through the condensing locality of the system, is determined by the condensing locality temperature, decreasing as that temperature approaches the temperature of the effective vapor pressure minimum.

In one specific example of practice of the present method for removal of calcium chloride in the decomposer first stage, the operating temperature of this decomposer stage is 1,050° C., and the temperature of the converter and heater is 1,250° C. As indicated in the table, with operation at these temperatures, the steady-state concentration of calcium chloride in the gas flow corresponds to a Ca/Al molar ratio of 0.00149 in the gas, which is well below the limiting value of 0.0025 required for maintenance of an Na/Ca molar ratio of 4.5:1 or less in the melt circuit of the purifying system 12. The additional calcium chloride volatilized in the gas flow on each pass through the converter, assumed in the table to provide an increment of 0.00050 in Ca/Al molar ratio on each pass, is entirely condensed in the decomposer and removed in molten state therefrom.

If magnesium chloride is also volatilized in the gas flow in the example of operation just described, it is likewise controlled in concentration level by condensation in the decomposer first stage. Specifically, such condensation proceeds by formation of a binary molten mixture of calcium and magnesium chlorides in chamber 32. The effective vapor pressures of both chlorides over the binary mixture are significantly lower than they would be at the same temperature in the absence of the mixture; it is by reason of this reduced volatility that magnesium chloride condenses in the decomposer first stage notwithstanding that the temperature therein is substantially above that of the effective vapor pressure minimum of magnesium chloride in aluminum trichloride gas. Moreover, in such case the constant concentration level of calcium chloride in the gas leaving chamber 32 is lower than it is when calcium chloride is present alone, again because of the supplemental reduction in effective vapor pressure occasioned by the binary mixture.

Stated generally, the proportionate composition of the binary condensate in chamber 32 corresponds to the relative portions of the two chlorides volatilized in the gas flow delivered to the decomposer. If the alloy in the converter has the exemplary composition set forth above, providing substantially equal increments in Ca/Al and Mg/Al molar ratios in the gas flow on each pass, the binary condensate in chamber 32 will contain about 50 mol percent $CaCl_2$ and about 50 mol percent $MgCl_2$. In this instance, at a decomposer first stage temperature of 1,000° C. the constant concentration of magnesium chloride in the gas flow leaving chamber 32 corresponds to an Mg/Al molar ratio of 0.0017 in the gas, while at a decomposer first stage temperature of 1,050° C. the Mg/Al molar ratio in the gas leaving chamber 32 is about 0.0027. Both these values are well within safe limits of magnesium chloride content in the gas for avoidance of troublesome concentrations of magnesium chloride in the melt circuit of the purifying system 12. The binary mixture is readily removed from chamber 32 in condensed, i.e. molten, state by the action of the dross screw 48. Condensation of magnesium chloride at other system localities (e.g. in the heater 14) is prevented by selecting temperature conditions therein so that the volatility of magnesium chloride in these other localities is higher than in the chamber 32.

In some instances, the proportions of magnesium chloride volatilized in the gas in the converter may be substantially higher than those represented by the above-mentioned exemplary values, depending on the magnesium content of the introduced alloy charge, and may tend to build up to undesirably high levels in the circulating gas flow owing to the fact that magnesium chloride exhibits relatively high volatility in aluminum trichloride (as will be evident from comparison of FIGS. 2 and 3), even when the foregoing procedure is employed. Further in accordance with the present invention, in a specific aspect thereof, additional chloride material other than magnesium chloride may be supplied to the chloride condensate in the decomposer chamber 32 in that event so as to reduce the proportion of magnesium chloride present therein. This dilution of magnesium chloride in the condensate has the effect of further reducing the effective vapor pressure of magnesium chloride, and consequently promoting its condensation, in the decomposer first stage; hence the constant concentration level of volatilized magnesium chloride passing with the gas beyond the decomposer first stage is correspondingly reduced to a desired low value.

For example, calcium may be deliberately added to the system in the form of lime mixed with the alloy charged to the converter, to enhance the proportion of volatilized calcium chloride (relative to magnesium chloride) present in the gas flow leaving the converter; since the calcium chloride level in the gas flow can be readily reduced to a satisfactorily low level by condensation in the decomposer first stage at temperatures approaching the temperature of the effective vapor pressure minimum of calcium chloride, the additional calcium supplied does not interfere with satisfactory system operation, but does result in dilution of the magnesium chloride content of the binary melt in the decomposer, thereby lowering the effective vapor pressure of magnesium chloride in the decomposer for reduction of the constant concentration level of magnesium chloride in the gas. In place of the supplemental calcium chloride, other salts (such as potassium chloride or sodium chloride) which form molten mixtures with magnesium chloride at the temperature of the decomposer first stage may be supplied to the chamber 32 as diluents for reducing the proportionate content of magnesium chloride in the melt therein to provide similar lowering of the effective vapor pressure of magnesium chloride.

The above-described procedures are also applicable to control of contaminant chloride level in the gas flow when magnesium chloride is the only such chloride volatilized in the flow. In such case, the temperature of the molten aluminum body 36 in chamber 32 may be maintained at a value appropriately close to the temperature of the effective vapor pressure minimum of magnesium chloride in aluminum trichloride, for condensation of magnesium chloride from the gas at the molten aluminum surface in this chamber, thereby to maintain the constant concentration level of magnesium chloride in the flow at a desired low level; and the temperature conditions elsewhere in the system (e.g. in the heater 14) are so chosen that the volatility of magnesium chloride at such other system localities is higher than in the chamber 32, to prevent condensation of magnesium chloride at these other localities. If necessary, supplemental reduction in the effective vapor pressure of magnesium chloride in the chamber 32 may be effected, as before, by supplying quantities of a second metal chloride to form a molten mixture with the condensing magnesium chloride in the chamber.

In modified embodiments of the invention as practiced in the system of FIG. 1, the condensation of contaminant chloride from the gas flow may be effected in the gas heater 14 rather than in the decomposer chamber 32. For instance, the provision made for electrical resistance heating of the bed of carbonaceous bodies in the heater 14 may be so arranged as to provide a vertical temperature gradient through the bed, or a succession of temperature zones in the bed, including a temperature zone suitably close to the temperature of the effective vapor pressure minimum of the contaminant chloride to be condensed.

Calcium and/or magnesium chloride will then condense in the latter zone, to the extent that such chloride or chlorides are present in the gas in excess of a level determined by the volatility of the chloride or chlorides at the temperature of the selected heater zone. The condensate drains downwardly through the heater and may be collected and removed from the heater e.g. in molten state as by tapping in suitable manner.

The constant concentration level of contaminant chloride in the gas is then determined by the effective vapor pressure at the selected heater zone, and the temperatures at other localities of the distillation system (including all stages of the decomposer) are maintained at values more remote from the effective vapor pressure minimum of the condensing chloride than is the aforementioned selected heater zone temperature, so that the volatility of such chloride at these other localities is higher than in this heater zone and no condensation can occur outside of the heater. For complete avoidance of condensation in the decomposer, the condensing temperature in the heater should be so chosen that the constant concentration level of contaminant chloride corresponding thereto, together with the increment in such concentration level added to the gas on each pass through the converter between the time it leaves the gas heater 14 and the time it enters the decomposer, is less than the concentration level corresponding to the volatility of the contaminant chloride in the decomposer.

In some instances of condensing operation in the heater, especially when both calcium and magnesium chlorides are present in the gas flow, it may be desirable to direct the gas flow upwardly through the carbonaceous bed therein rather than downwardly as indicated in FIG. 1, while exposing the gas to carbonaceous bodies maintained at successively higher temperatures extending through the range of the effective vapor pressure minima of calcium and magnesium chlorides. Since the temperature of the effective vapor pressure minimum of calcium chloride is higher than that of magnesium chloride, calcium chloride will condense from the gas flow at an upper locality of the heater, and will flow downwardly, refluxing with the gas, to absorb magnesium chloride from the gas at a level at which the temperature is close to that of the magnesium chloride vapor pressure minimum. A binary magnesium chloride-calcium chloride melt is thus provided at the locality of magnesium chloride condensation, for supplemental reduction of magnesium chloride effective vapor pressure at such locality, thereby to lower the constant concentration level of magnesium chloride in the gas.

In further illustration of the present method, reference may be made to the following additional specific examples of operation in a system of the general character shown in FIG. 1. In each of these examples, the converter temperature is 1,250° C., the rate of feed of alloy to the converter is 4,000 lb./hr., and the flow rate of aluminum trichloride gas through the converter is 20,000 lb./hr.

Example 1

An alloy containing 0.18% calcium by weight is charged to the converter and reacts with aluminum trichloride therein to add 20 lb./hr. of volatilized calcium chloride to the gas. The gas heater 14 is arranged for downward gas flow and has a bottom (outlet) temperature of 1,250° C. Liquid calcium chloride forms in the heater and drains downward; 20 lb./hr. of calcium chloride condensate are removed from the heater, and the steady state concentration of calcium chloride in the gas leaving the heater is 2.7 lbs. of calcium chloride per 1,000 lbs. of aluminum trichloride.

Example 2

An alloy containing 0.13% magnesium by weight is fed to the converter and reacts with trichloride therein to add 20 lb./hr. of magnesium chloride to the gas flow. The gas is led from the converter to a splashed molten metal decomposer stage operating at a molten aluminum temperature of 900° C. A liquid flux of magnesium chloride forms on top of the molten metal in the decomposer and is removed in condensed state at a rate of 20 lb./hr. The concentration of magnesium chloride in the gas leaving this decomposer stage, and led to a subsequent stage or stages for further cooling is 18 lbs. of magnesium chloride per 1,000 lbs. of aluminum trichloride. No. aluminum chloride condenses from the gas in the latter decomposer stages.

Example 3

The alloy charged to the converter contains 0.16% calcium and 0.064% magnesium by weight. In this example, the gas heater is arranged for upward gas flow (with a temperature of 1,250° C. at the top), and provision is made for tapping off liquid from the heater at a level at which the heater temperature is 950° C. Calcium and magnesium chlorides condensing to liquid state above this level reflux with the ascending gas as they drain down. 27.8 lb./hr. of liquid of molten salt mixture containing 64% by weight calcium chloride and 36% by weight magnesium chloride (with a small quantity of aluminum trichloride) are tapped from the heater, and the gas leaving the heater contains 0.78 lbs. of calcium chloride and 6.65 lbs. of magnesium chloride per 1,000 lbs. of aluminum trichloride.

It is to be understood that the invention is not limited to the procedures and embodiments hereinabove set forth, but may be carried out in other ways without departure from its spirit.

I claim:

1. A method of removing, from a gas flow comprising aluminum trichloride gas and advancing along a defined path, at least one metal chloride of the class consisting of calcium chloride and magnesium chloride present in volatilized state in said flow and having an effective vapor pressure minimum therein at a temperature above the melting point of said one chloride, said method comprising:
  (a) conducting said flow into extended surface contact with heat transfer material at a preselected locality in said path at which said flow is at an initial temperature different from the temperature of said effective vapor pressure minimum, while
  (b) maintaining said heat transfer material at a predetermined temperature closer than said initial flow temperature to the temperature of said effective vapor pressure minimum, for altering the temperature of said flow in the direction of said predetermined temperature to effect condensation of said one chloride from said flow at said preselected locality, said temperature of said effective vapor pressure minimum being in a range between about 900° C. and about 1100° C., said initial flow temperature being in a range between about 600° C. and about 1300° C., said predetermined temperature corresponding to a selected value of effective vapor pressure of said one chloride in said flow, lower than the value of effective vapor pressure corresponding to said initial flow temperature; and
  (c) transferring said one chloride in condensed state from said preselected locality to a locality external to said path.

2. A method according to claim 1, wherein said one chloride is calcium chloride, the temperature of said effective vapor pressure minimum being about 1,100° C.

3. A method according to claim 1, wherein said one chloride is magnesium chloride, the temperature of said effective vapor pressure minimum being about 900° C.

4. A method according to claim 1, including the step of supplying to said selected locality a second metal chloride capable of forming a liquid mixture with said one chloride at said predetermined temperature for absorbing said one chloride from said gas flow into said liquid chloride, and wherein said step of transferring said one chloride in condensed state from said selected locality comprises conveying quantities of liquid mixture of said one chloride and said second chloride from said selected locality to said external locality.

5. A method according to claim 1, wherein said initial temperature of said flow is higher than the temperature of said effective vapor pressure minimum, and wherein said step of maintaining said heat transfer material at said predetermined temperature comprises removing heat from said heat transfer material for cooling said flow.

6. A method according to claim 1, wherein said initial temperature of said flow is lower than the temperature of said effective vapor pressure minimum, and wherein said step of maintaining said heat transfer material at said predetermined temperature comprises supplying heat to said heat transfer material for heating said flow.

7. A method according to claim 1, wherein said one chloride is calcium chloride, wherein magnesium chloride is also present in volatilized state in said gas flow, and wherein magnesium chloride condenses together with calcium chloride from said flow at said preselected locality by formation of a molten condensate mixture of calcium chloride and magnesium chloride therein, said step of transferring said one chloride in condensed state from said preselected locality comprising transferring said molten condensate mixture therefrom.

8. A method for subhalide distillation of aluminum comprising continuously circulating a flow of gas along a defined path extending successively through a heating region in which said gas is heated, a converting region in which the heated gas is exposed to aluminum-containing metallic material for reaction of aluminum trichloride in the gas with aluminum in said material to form aluminum monochloride gas, and a decomposing region in which the gas is cooled for decomposition of the monochloride into purified aluminum metal and gaseous aluminum trichloride, at least one metal chloride of the class consisting of calcium chloride and magnesium chloride being present in volatilized state in said flow and having an effective vapor pressure minimum therein at a temperature above the melting point of said one chloride, wherein the improvement comprises (a) conducting said flow into extended surface contact with heat transfer material at a preselected locality in said path at which the initial temperature of said flow is different from the temperature of said effective vapor pressure minimum, while (b) maintaining said heat transfer material at a predetermined temperature closer than said initial flow temperature to the temperature of said effective vapor pressure minimum, for altering the temperature of said flow in the direction of said predetermined temperature to effect condensation of said one chloride from said flow at said preselected locality, said predetermined temperature being chosen to reduce the concentration of said one chloride in said flow to a given limiting value, and while (c) maintaining the temperatures of material surfaces exposed to said flow, at all localities in said path other than said preselected locality, at values more remote than said predetermined temperature from said temperature of said effective vapor pressure minimum; and (d) transferring said one chloride in condensed state from said preselected locality to a locality external to said path.

9. A method according to claim 8, wherein said preselected locality is within said decomposing region, and wherein said step of maintaining said heat transfer material at said predetermined temperature comprises removing heat from said heat transfer material for cooling said flow to effect condensation of said one chloride therefrom and concomitant decomposition of said monochloride therein.

10. A method according to claim 9, wherein said one chloride is calcium chloride and wherein said predetermined temperature is in a range between about 1,000° C. and about 1,100° C.

11. A method according to claim 8, wherein said preselected locality is within said heating region, and wherein said step of maintaining said heat transfer material at said predetermined temperature comprises supplying heat to said heat transfer material for effecting condensation of said one chloride and concomitantly heating said gas for introduction to said converting region.

12. A method according to claim 8, wherein said one chloride is calcium chloride, wherein magnesium chloride is also present in volatilized state in said gas flow, and wherein magnesium chloride condenses together with calcium chloride from said flow at said preselected locality by formation of a molten condensate mixture of calcium chloride and magnesium chloride therein, said step of transferring said one chloride in condensed state from said preselected locality comprising transferring said molten condensate mixture therefrom.

13. A method according to claim 12, including the step of supplying supplemental quantities of calcium-containing material to said converting region in mixture with said aluminum-containing metallic material for reaction of said calcium-containing material with aluminum trichloride in said converting region to form calcium chloride augmenting the content of volatilized calcium chloride in said flow as advanced from said converting region to said decomposing region, thereby to enhance the proportion of calcium chloride relative to magnesium chloride in said molten condensate mixture for lowering the effective vapor pressure of magnesium chloride above said mixture in said preselected locality.

References Cited

UNITED STATES PATENTS

| | | | |
|---|---|---|---|
| 2,813,786 | 11/1957 | Milliken | 55—71 X |
| 3,078,159 | 2/1963 | Hollingshead | 75—68 X |
| 3,311,363 | 3/1967 | Phillips et al. | 75—68 X |
| 3,384,475 | 5/1968 | Phillips et al. | 75—68 |

L. DEWAYNE RUTLEDGE, *Primary Examiner.*

HENRY W. TARRING, *Assistant Examiner.*

U.S. Cl. X.R.

75—63; 23—96, 294; 55—71, 72, 69, 86, 90